United States Patent [19]

Dreyer et al.

[11] 4,142,685
[45] Mar. 6, 1979

[54] MACHINE FOR THE PNEUMATIC SPREADING OF GRANULAR MATERIAL

[75] Inventors: Heinz Dreyer, Hasbergen-Gaste; Heinz Bolwin, Georgsmarienhütte; Werner Hülsmann, Osnabruck, all of Fed. Rep. of Germany

[73] Assignee: Amazonen-Werke H. Dreyer, Hasbergen-Gaste, Fed. Rep. of Germany

[21] Appl. No.: 775,355

[22] Filed: Mar. 7, 1977

[30] Foreign Application Priority Data

Mar. 9, 1976 [DE] Fed. Rep. of Germany ....... 2609686

[51] Int. Cl.² .............................................. A01C 15/04
[52] U.S. Cl. ...................................... 239/655; 222/193
[58] Field of Search ........................ 239/655, 654, 670; 222/193, 627

[56] References Cited

U.S. PATENT DOCUMENTS

| 411,692 | 9/1889 | Strawson | 239/654 |
|---|---|---|---|
| 3,202,320 | 8/1965 | Patton | 222/193 X |
| 4,008,854 | 2/1977 | van der Lely et al. | 239/655 |

FOREIGN PATENT DOCUMENTS

| 663873 | 5/1963 | Canada | 239/670 |
|---|---|---|---|
| 2319940 | 11/1974 | Fed. Rep. of Germany | 239/655 |
| 2432737 | 1/1976 | Fed. Rep. of Germany | 222/193 |
| 2453993 | 5/1976 | Fed. Rep. of Germany | 239/655 |

Primary Examiner—Robert B. Reeves
Assistant Examiner—Michael J. Forman
Attorney, Agent, or Firm—Sprung, Felfe, Horn, Lynch & Kramer

[57] ABSTRACT

A machine is provided which is mountable on another vehicle for effecting the pneumatic spreading of granular material along a working direction. The machine is of the type that has a central hopper divided in its lower area by a roof shaped middle part disposed in the working direction into two sections which have outlet openings and a metering device driven through a regulating drive which is receptive of material from the outlet openings. Tubes are provided which are receptive of material from the metering device and have a portion overreaching the hopper transversely of the working direction and discharge openings at the outer extremities thereof exposed at intervals from one another transversely of the working direction. A blower is situated forward of the machine and has an impeller shaft which is driveable by the powered take up shaft of the vehicle pulling the machine. An air duct connects the blower to the tube. In order to obtain a compact construction, the blower has the front walls thereof disposed behind the front wall of the hopper and the impeller shaft is mounted at the rear end of the hopper and is driven from the power take off shaft of the vehicle pulling the machine by a shaft disposed underneath the roof shaped middle part of the hopper.

12 Claims, 3 Drawing Figures

MACHINE FOR THE PNEUMATIC SPREADING OF GRANULAR MATERIAL

BACKGROUND

The invention relates to a machine for the pneumatic spreading of granular material, which is constructed for mounting on a farm tractor and is equipped with a central hopper and tubes some of which extend beyond the hopper transversely of the direction of movement of the tractor, and which are connected by an air duct to a blower mounted on the machine and driven by the power take-off shaft of the tractor carrying the machine, the material being fed to the said tubes from the hopper through outlet openings and a metering device driven by a regulating drive, the said tubes having discharge openings at their outer extremities which are disposed at intervals transversely of the direction of movement of the tractor, the hopper being divided in its lower area by a roof-shaped plate into a forward and a rearward section, the said sections being provided with the said discharge openings and with metering devices.

A machine of this kind is known through German "Auslegeschrift" 23 19 940. This machine has proven to be practical, but it has the disadvantage mainly that it is relatively long, so that, when mounted on the tractor, its center of gravity is located so far in back of the machine that, in order to lift it into the working position with the hopper filled, a lifting force is required which can be supplied only by the power lift systems of heavy and powerful tractors.

Even in the case of such tractors as these, there is the danger that the weight will be removed from their front wheels to such an extent, when the machine is in the raised position, that it will no longer be possible to hold the tractor precisely on the desired course of travel.

THE INVENTION

The invention is addressed to the problem of improving this machine such that it will retain at least the same carrying capacity while being of a very short and compact construction which will situate the center of gravity of the machine substantially closer to the tractor.

This problem is solved by the invention in that the front wall of the blower does not extend forward beyond the forward wall of the hopper, that the blower impeller shaft is carried at the rearward end of the hopper and is driven from the power take-off shaft of the tractor carrying the machine through a shaft situated underneath the roof-shaped divider of the hopper. As a result of these measures, the distance between the forward wall of the hopper and the rear parts of the tractor can be kept desirably short. At the same time an important structural simplification is achieved by the fact that the front wall of the blower forms one unit with the front wall of the hopper.

It is furthermore provided in accordance with the invention that the gable-shaped divider forms the roof of the air duct and the shaft beneath it passes through this air duct. This permits an additional structural simplification in that the air duct together with the roof-shaped divider of the hopper can form the load-bearing part of the machine, thus eliminating the need for a separate supporting frame.

The invention furthermore provides that the forward end of the shaft below the roof-shaped divider is located at a distance in back of the front wall of the hopper. This results in the additional advantage that the tumbler shaft for transmitting the drive from the tractor's power take-off shaft to the shaft under the gable-shaped divider of the hopper and hence to the blower can be of such great length that, when the machine is lowered, there is no danger that the two halves of the tumbler shaft will fail to have sufficient engagement with one another much less become separated.

If the intake opening of the blower is disposed in the rear wall of same and the impeller shaft of the blower passes through the discharge opening, the compact construction of the machine prevents the mud and dust thrown from the rear wheels of the tractor from getting into the blower and eventually causing trouble in the blower and air ducts.

In accordance with the invention, furthermore, the regulating drive of the metering system and the control mechanism thereof are also to be located at the rear end of the hopper. This results in an additional shortening of the overall length of the machine. Also, the control mechanism and drive of the metering system are easily accessible for adjustment or any necessary repairs.

In a preferred embodiment, the invention also provides that the roof-shaped divider has at its lower end a width which corresponds at least approximately to the distance between two adjacent discharge openings. This measure results in a substantially greater capacity in the hopper in spite of the compact design, i.e., without increasing the overall height of the machine, since the widening of the hopper that is thereby achieved increases its capacity to several times the loss of capacity that could be attributed to the widening of the roof-shaped divider.

BRIEF DESCRIPTION OF THE DRAWINGS

The invention will now be further explained in detail with the aid of the embodiment represented in the appended drawing, wherein.

Figure 1:
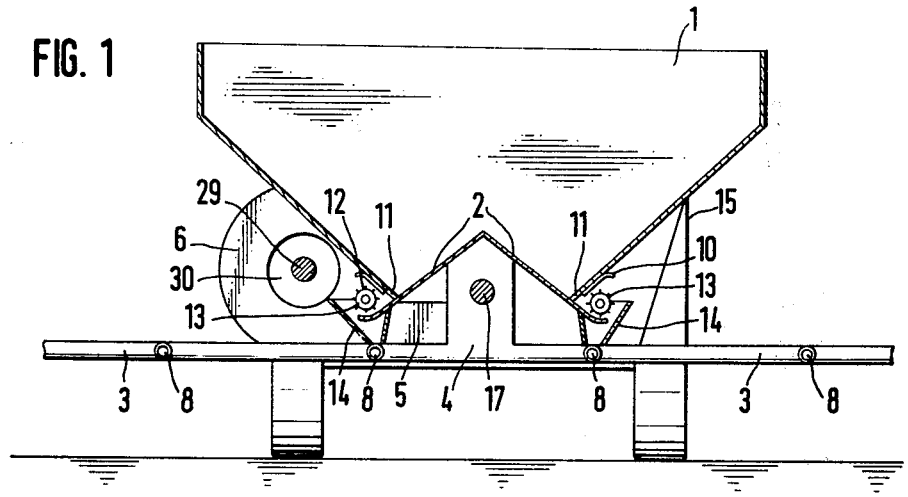
FIG. 1 is a cross-sectional view of a machine of the invention in the raised position.

The machine is equipped with a central hopper 1 which is divided in its lower portion into two sections by a roof-shaped divider 2. Under the hopper 1 there are located on both sides eight tubes 3 which are connected to an air duct 4 into which air is discharged by the straight portion 5 of the blower 6. Seven of these tubes 3 overreach each side of the hopper 1 transversely of the direction of travel 7 and are equipped with the discharge openings 8 at their outer extremities which face rearwardly and are disposed at equal intervals transversely of the direction of travel 7. Opposite the discharge openings are situated the deflectors 9 which slant downwardly and deflect towards the ground the particles of material blown from the discharge openings 8. At the same time, the roof-shaped divider 2 has at its bottom end a width corresponding approximately to the distance between the middle discharge openings 8.

The material in the hopper 1 passes through the outlet openings 11, which can be closed by the shutters 10, to the metering device 12 whose metering elements, in the form of the paddle wheels 13, deliver it through the funnels 14 to the tubes 3, which are equipped at their point of entry with injectors, in a known but not indicated manner. The paddle wheels 13 are driven from the power take-off shaft of the tractor 15 carrying the machine, through the tumbler shaft 16, a shaft 17 rotatably mounted under the roof-shaped divider 2 and passing through the air duct 4, the chain drive 18, the regulating drive 19 and the chain drives 20 and 21, a reversing transmission 22 being disposed between these two chain drives. To permit the regulation of the rotatory speed of the paddle wheels 13 and hence the rate of discharge, the stepless speed change mechanism 23 is provided on the regulating drive 19.

The blower 6 is located forward on the hopper 1, the front wall 24 of the blower 6 being made in one piece with the front wall of the hopper 1. Also mounted on the front wall 25 of the hopper 1 is the attaching means 26 for coupling the machine to the power lift 27 of the tractor 15.

The blower 6 is driven from the tractor power takeoff shaft through the tumbler shaft 16, the shaft 17, transmission means in the form of the V-belt drive 28 and the impeller shaft 29. The impeller shaft 29 is brought through the intake opening 30 of the blower 6, this air intake opening 30 being situated in the rear wall 31 of the blower 6. Furthermore, the forward end of the shaft 17 is located at such a distance in back of the front wall 24 of the hopper 1 that the universal joint 32 by which the tumbler shaft 16 is joined to shaft 17 is covered by the roof-shaped divider 2.

Figure 2:
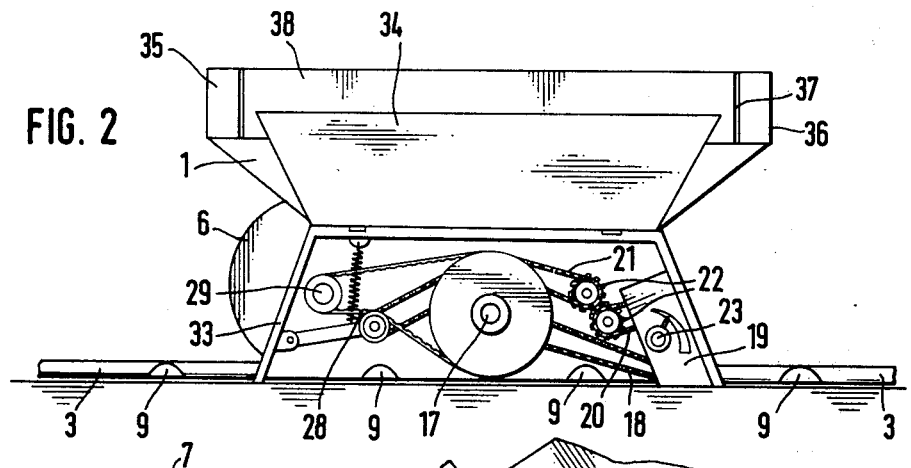
FIG. 2 is a rear elevational view of the same machine in the lowered position.

As indicated in FIG. 2, the chain drives 18, 20 and 21, the regulating drive 19, the reversing transmission 22, the speed change mechanism 23 and the V-belt drive 28 and the metering device 12 are situated within a housing 33 whose rear wall 34 is hinged and is shown in the position in which it is raised up and locked in place. In this manner the fouling of these drive and adjustment means is prevented, while they remain easily accessible.

Figure 3:
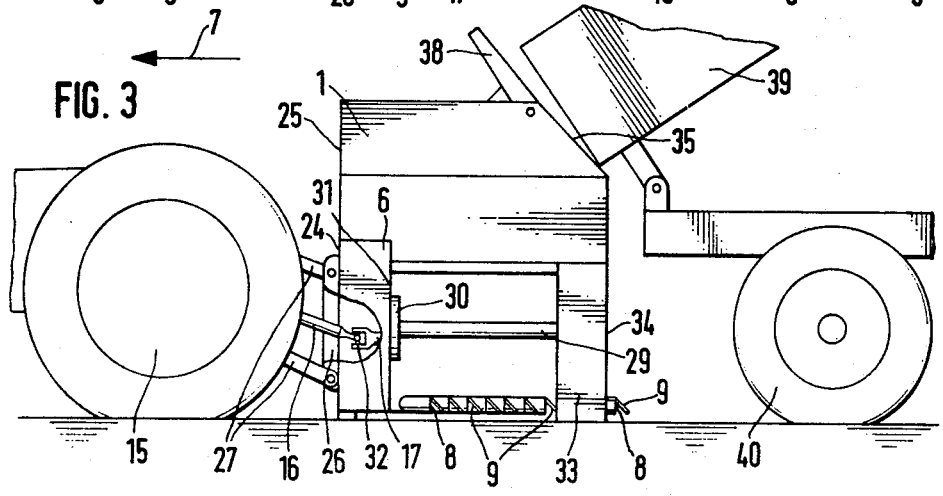
FIG. 3 is a side elevational view of the same machine in the lowered position.

Due to the fact that the front wall 25 of the hopper 1 and the housing 33 reach to some distance below the tubes, a secure bearing surface is additionally created on which the machine rests when in the lowered position as represented in FIG. 3. These measures, too, thus contribute towards the desired low profile of the machine. Furthermore, the need for a separate frame is eliminated.

Lastly, the rear wall 35 of hopper 1 is inclined towards the middle of the hopper 1 in its upper portion 36 and equipped with a cutout 37 which can be closed by a hinged wall portion 38. This, as represented in FIG. 3, also permits the convenient direct loading of the hopper from the raised dump body 39 of a transport vehicle 40 which has been driven up to the machine which is lowered to the ground.

We claim:

1. In a machine mountable on another vehicle for the pneumatic spreading of granular material along a working direction and having a central hopper divided in its lower area by a roof-shaped middle part disposed in the working direction into two sections which have outlet openings, and a metering device driven through a regulating drive, receptive of material from the outlet openings, tubes receptive of material from the metering devices and having a portion overreaching the hopper transversely of the working direction and discharge openings at the outer extremities of said tubes disposed at intervals from one another transversely of the working direction, a blower situated at the forward end of the machine and having an impeller shaft driveable by the power take-off shaft of the vehicle pulling the machine, an air duct connecting the blower to the tubes, wherein the improvement comprises the blower having a front wall which does not extend forward of the front wall of the hopper, the impeller shaft of the blower extending to the rear end of the hopper, and means for driving of the impeller shaft by the power take-off shaft of the vehicle pulling the machine comprising a shaft disposed underneath the roof-shaped middle part of the hopper.

2. The machine of claim 1, characterized in that the front wall of the blower is integral with the front wall of the hopper.

3. The machine of claim 1, characterized in that the roof-shaped middle part forms the roof of the air duct and the shaft disposed beneath the middle part extends through the air duct.

4. The machine of claim 3, characterized in that the blower includes an air intake opening disposed in the rear wall thereof and the impeller shaft extends through the air intake opening.

5. The machine of claim 3, characterized in that the regulating drive of the metering device includes a speed change mechanism and wherein said regulating drive and speed change mechanism are located at the rear end of the hopper.

6. The machine of claim 1, characterized in that the front end of the shaft disposed beneath the roof-shaped middle part is located at a distance behind the front wall of the hopper.

7. The machine of claim 1, characterized in that the blower includes an air intake opening disposed in the rear wall thereof and the impeller shaft extends through the air intake opening.

8. The machine of claim 1, characterized in that the regulating drive of the metering device includes a speed change mechanism and wherein said regulating drive and speed change mechanism are located at the rear end of the hopper.

9. The machine of claim 8, said means for driving of the impeller shaft by the power take-off shaft further comprising transmission means for driving the impeller shaft off said shaft disposed underneath the roof-shaped middle part, the machine further comprising a housing having a hinged rear wall, and wherein the transmission means, the metering device, the regulating drive and the speed change mechanism are contained in the housing.

10. The machine of claim 9, characterized in that the front wall of the hopper and the housing extend downwardly a short distance beyond the tubes.

11. The machine of claim 1, characterized in that the roof-shaped middle part has at its lower end a width which corresponds at least approximately to the distance between two adjacent outlet openings.

12. The machine of claim 1, characterized in that the rear wall of the hopper has an upper portion inclined toward the middle of the hopper, and having a cutout portion and a wall portion for closing the cutout.

* * * * *